(12) United States Patent
Allen

(10) Patent No.: US 7,081,072 B2
(45) Date of Patent: Jul. 25, 2006

(54) BAR CLAMP CONNECTION

(76) Inventor: D. Mason Allen, 1380 Lakeshore Dr., Mt. Dora, FL (US) 32757

( * ) Notice: Subject to any disclaimer, the term of this patent is extended or adjusted under 35 U.S.C. 154(b) by 518 days.

(21) Appl. No.: 10/326,950

(22) Filed: Dec. 24, 2002

(65) Prior Publication Data

US 2004/0121887 A1    Jun. 24, 2004

(51) Int. Cl.
*A63B 21/72*    (2006.01)
*F16L 39/00*    (2006.01)

(52) U.S. Cl. .................... 482/106; 285/133.11

(58) Field of Classification Search ............ 482/49–50, 482/106–108; 403/49, 169–170, 175; 285/133.11, 285/305, 18
See application file for complete search history.

(56) References Cited

U.S. PATENT DOCUMENTS

| | | | |
|---|---|---|---|
| 3,383,738 A | 5/1968 | Fox et al. | |
| 4,310,110 A | 1/1982 | Dexter | |
| 4,364,560 A * | 12/1982 | Gemmel | 473/437 |
| 4,807,669 A * | 2/1989 | Prestidge, Sr. | 138/178 |
| 5,100,393 A | 3/1992 | Johnson | |
| 5,300,037 A | 4/1994 | Delk et al. | |
| 5,496,243 A * | 3/1996 | Allen | 482/106 |
| 5,598,995 A | 2/1997 | Meuth et al. | |
| 5,714,738 A * | 2/1998 | Hauschulz et al. | 219/535 |
| 5,898,975 A | 5/1999 | Hancock | |
| 6,049,953 A | 4/2000 | McCay et al. | |
| 6,082,781 A * | 7/2000 | Spiegel et al. | 285/133.11 |
| 6,149,825 A * | 11/2000 | Gargas | 210/788 |

* cited by examiner

Primary Examiner—Gregory L. Huson
Assistant Examiner—Fenn C. Mathew
(74) Attorney, Agent, or Firm—William M. Hobby, III

(57) ABSTRACT

A bar clamp connection connects an elongated bar member, such as the handle of a dumbbell to a bar clamp. The bar clamp has a clamp body having an elongated open sided tube having a side opening sized to receive a predetermined elongated bar member therein. A tubular extension extends perpendicular from the open sided tube for attaching to a matching tubular member. A strip of hook and loop material has the hoop portion on one side of the material and the loop portion on the other side of the material and can be adhesively attached to the clamp body such that the strip of hook and loop material can be wrapped over the open side of the open sided tube having an elongated bar member therein and attached to the hook and loop material on the other side thereof. The hook and loop material is adhesively attached to the clamp body and also has an opening therein which is fitted over the clamp body tubular extension. The elongated bar member can be the handle of a dumbbell and one bar clamp body can be attached to each end of an elongated rod for supporting a dumbbell on each end thereof to thereby convert a pair of dumbbells into a barbell.

5 Claims, 3 Drawing Sheets

BAR CLAMP CONNECTION

BACKGROUND OF THE INVENTION

The present invention relates to a bar clamp connection and especially to a bar clamp connection for mounting on the end of a rod or the like for clamping a bar to the end of the rod.

In the past, there have been a wide variety of clamp assemblies for attaching rods, pipes, hoses, cables or the like to another rod-like member, such as a pipe or a rod. Many types of clamp assemblies have been used to secure the members to one another. The rod or pipe members may be horizontally positioned or vertically positioned. However, a great many of the prior art clamps have been directed towards connecting pipes to each other or holding cables, pipes or tubes in a fixed parallel position attached to another pipe or rod.

Prior art U.S. patents for clamps and holders can be seen in the Hancock U.S. Pat. No. 5,898,975 for a multipurpose holder with a flexible block having a guide surface for securement and attachment to a variety of surfaces including attaching one pipe to another in either a parallel or perpendicular connection and in the Meuth et al. U.S. Pat. No. 5,598,995 for a high strength clamp assembly with flexible straps. In this patent, a clamp assembly for clamping a pipe or the like to a support member which may be another pipe and includes a pair of flexible support straps connected to a receptacle and a pair of flexible clamping straps for connecting one or more members to a support member and specifically to attach one or more pipes to another pipe. The W. A. Fox et al. U.S. Pat. No. 3,383,738 shows a device for tieing chairs in a side-by-side relationship to form a fixed row of chairs from individual chairs and includes a spacer to fit between the chairs which are wrapped with a VELCRO strap. The Dexter U.S. Pat. No. 4,310,110 shows a scuba tank harness which straps a scuba tank to the harness. The Johnson U.S. Pat. No. 5,100,393 is a holder for elongated members and especially for holding medical tubes, such as catheters, while the catheter is in use. In the U.S. Pat. No. 6,049,543 to McCay et al., a flexible fastener assembly has a double ended flexible strap having a flexible hook fastener assembly in each end for strapping items together. The Delk et al. U.S. Pat. No. 5,300,037 is for a medical conduit holder which temporarily clamps a conduit adjacent the surface of an object for holding medical conduits to a patient's body.

In contrast, the present invention is directed towards a bar clamp connection for connecting an elongated bar, rod, tube or the like, generically referred to as an elongated bar, to another elongated bar, pipe, rod or tube. An elongated tubular member has an open side for inserting an elongated bar member and wherein the open side is closed with a hook and loop strap which is strapped over the open side. The far clamp connection is ideally suitable for attaching a pair of dumbbells to the end of an elongated rod or pipe for rapidly converting the dumbbells to a barbell.

SUMMARY OF THE INVENTION

A bar clamp connection connects an elongated bar member, such as the handle of a dumbbell to a bar clamp. The bar clamp has a clamp body having an elongated open sided tube having a side opening sized to receive a predetermined bar member therein and a tubular extension extending perpendicular from the open sided tube for attaching to a matching tubular member. A strip of hook and loop material has the hoop portion on one side of the material and the loop portion on the other side of the material and can be adhesively attached to the clamp body such that the strip of hook and loop material can be wrapped over the open side of the open sided tube having an elongated bar member therein and attached to the hook and loop material on the other side thereof. The hook and loop material is adhesively attached to the clamp body and also has an opening therein which is fitted over the clamp body tubular extension. In one embodiment, the elongated bar member is the handle of dumbbell and one bar clamp body is attached to each end of an elongated rod for supporting a dumbbell on each end thereof to thereby convert a pair of dumbbells into a barbell.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
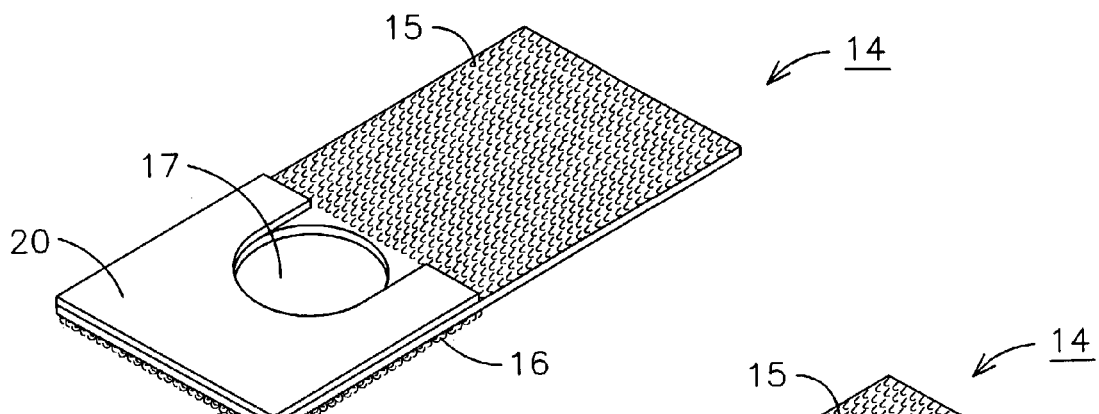
FIG. 1 is a perspective view of a hook and loop strap for use with the present invention.
Figure 2:
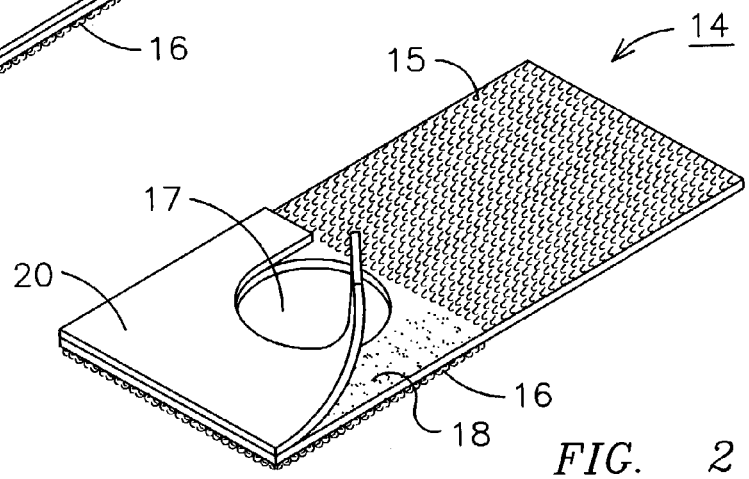
FIG. 2 is a perspective view of the hook and loop strap of FIG. 1 with the adhesive cover being peeled off.
Figure 3:
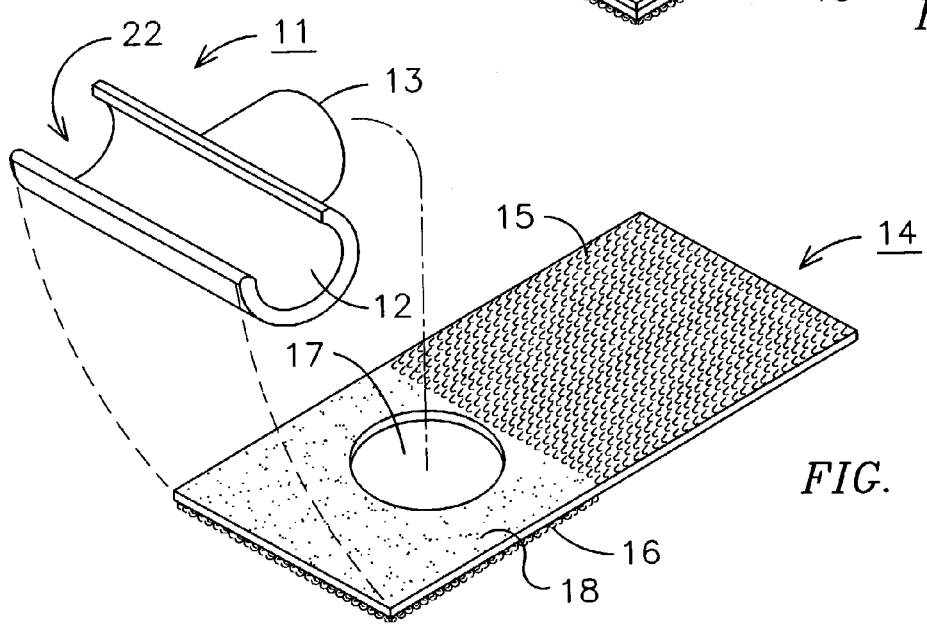
FIG. 3 is a perspective view of the hook and loop strap of FIGS. 1 and 2 being attached to the body of the bar clamp of the present invention.
Figure 4:
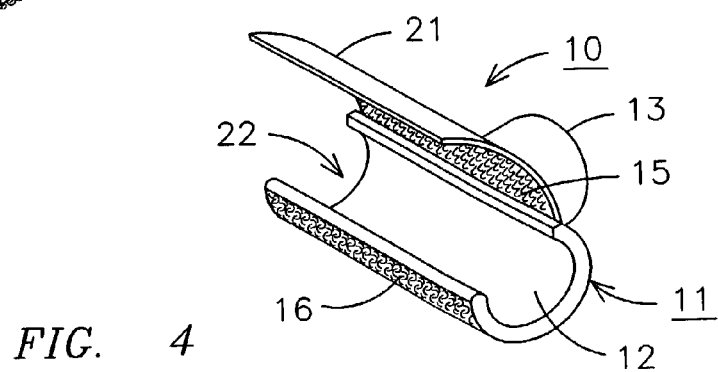
FIG. 4 is a perspective view of the bar clamp of the present invention.

Referring to the drawings and especially to FIGS. 1 to 4, a bar clamp 10 is illustrated in FIG. 4 having a body 11 with an elongated open sided tube 12 extending in one direction and a tubular extension 13 extending perpendicular therefrom. A strap 14, as more clearly shown in FIGS. 1–3, has a hook and loop strap material on both sides with hook material 15 covering a portion of one side and the loop material 16 covering a portion of the other side. The hook and loop strap 14 has an opening 17 which is sized to fit over the tubular extension 13. An adhesive coated portion 18 of the strap 14 adjacent the hook material 15 and partially surrounding the opening 17 has an adhesive cover 20 thereover. The hook and loop strap 14 is attached to the body 11 of the bar clamp 10, as illustrated in FIGS. 1 to 3, by removing the adhesive cover 20 covering the adhesive 18 and sliding the strap opening 17 onto the tubular extension 13 and pressing the adhesive 18 onto the body of the open sided tube 12 allows the loop material 16 to extend around the open tube clamp portion 12. The strapping portion 21 having the hook material 15 on one side thereof flexibly extends out over the opening 22 of the open sided tube 12, as seen in FIG. 4. The locking strap portion 21 can then be extended over the opening 22 and attached to the loop material 16. Thus, when an elongated bar is placed in the open sided tube 12 through the opening 22 and the strap portion 21 is pulled over the opening, allows the hook and loop material 15 to be attached to hook and loop material 16 to lock the bar in the bar clamp 10.

Figure 5:
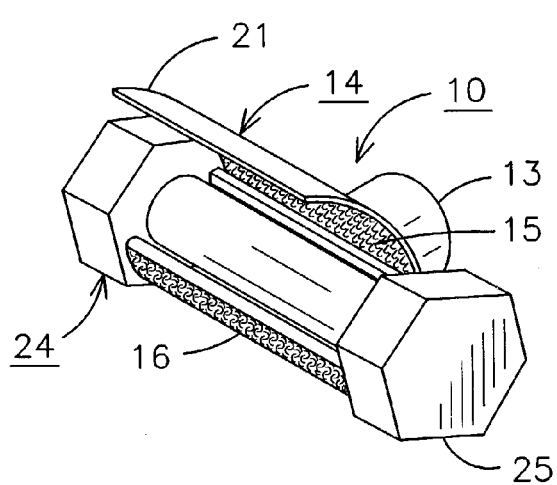
FIG. 5 is a perspective view of the bar clamp of FIG. 4 having the dumbbell placed therein.
Figure 6:
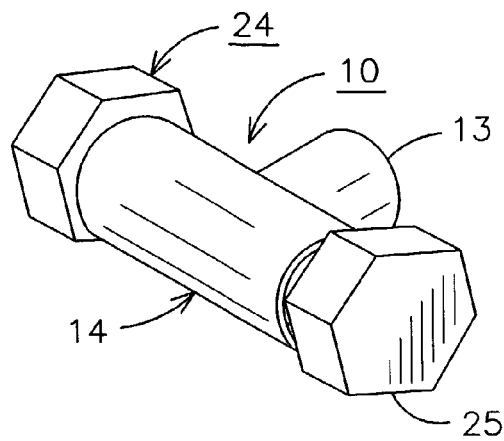
FIG. 6 is a perspective view of the bar clamp having a dumbbell attached thereto.
Figure 7:
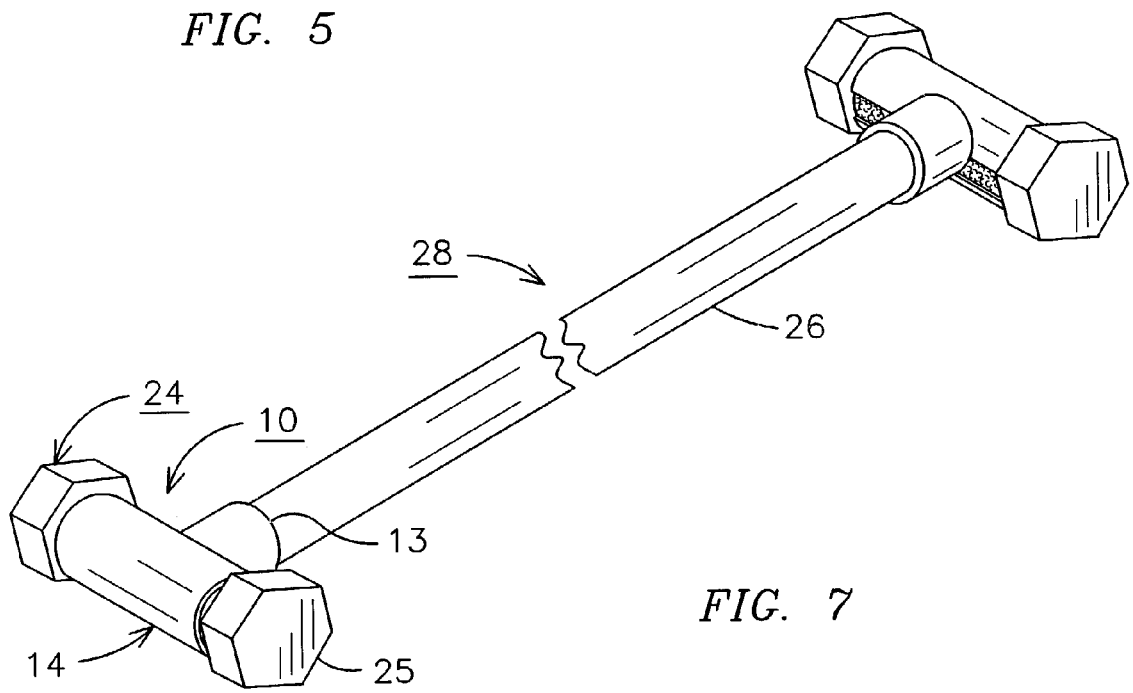
FIG. 7 is a perspective view of a bar bell made from a pair of dumbbells utilizing the bar clamps of the present invention.

Turning to FIGS. 5–7, the bar clamp 10 has the tubular extension 13 and the hook and loop strap 14 attached thereto. The handle 23 of a dumbbell 24 is placed through the opening 22 of the open sided tube 12 with the weight portions 25 extending to either side. Thus, the handle 23 is the elongated bar member being attached to the bar clamp 10. In FIG. 5, the dumbbell 24 has been placed within the bar clamp 10 while in FIG. 6 the hook and loop strap 14 extension 21 has been pulled over the dumbbell 24 handle 23 and attached to the hook and loop portion 16 to thereby lock the dumbbell 24 in the clamp.

In FIG. 7, an elongated handle 26, which may be a metal or plastic tube or a solid bar or rod, has a bar clamp 10 attached to each end thereof by the tubular extension 13 sliding over the end portion 27 of the bar 26 on each end of the bar 26. The tubular extension 13 is adhesively anchored to the lifting bar 26 or may be welded or threadedly attached as desired.

As shown in FIG. 7, a dumbbell 24 is attached to each of the bar clamps 10 and is locked in place to form a barbell 28. The dumbbells 24 can be rapidly inserted within the bar clamps 10 and rapidly removed simply by opening and closing the hook and loop flap 14. It, of course, will be clear that while the hook material 15 is on the flap portion 14 and the loop material 16 is on the opposite side of the hook and loop strap, the hook and loop material can be swapped or positioned in any manner desired without departing from the spirit and scope of the invention. The embodiment of FIG. 7 allows an individual to use his dumbbells and to rapidly convert the dumbbells to a barbell for additional weight training.

Figure 8:
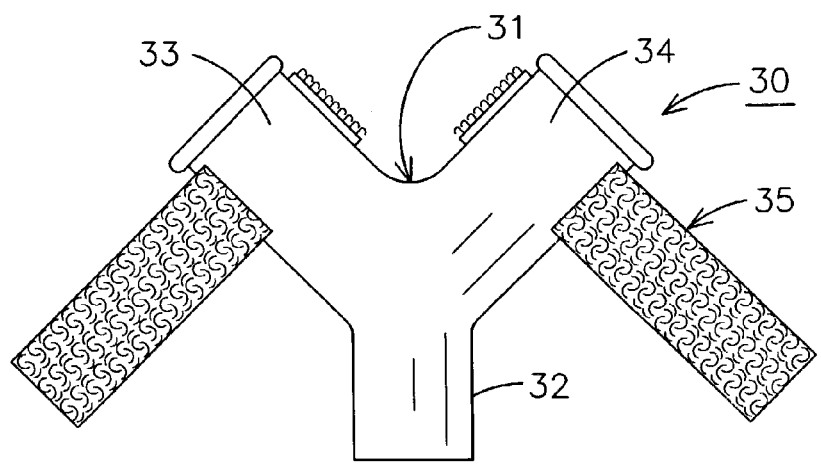
FIG. 8 is an alternate embodiment of a bar clamp for clamping to the elongated bars thereto.

Referring to FIG. 8, a second embodiment of a bar clamp 30 is illustrated having a body 31 having a tubular extension 32 for attaching to a rod or pipe or the like and has a pair of open tube ends 33 and 34 forming a "Y" shape. Each side opening tube 33 and 34 has a hook and loop strap 35 attached thereto with an adhesive, as in the hook and loop straps illustrated in FIGS. 1–4. The hook and loop strap 35 can then be strapped over the opening in each of the tubes 33 and 34 to lock an elongated bar member therein.

Figure 9:
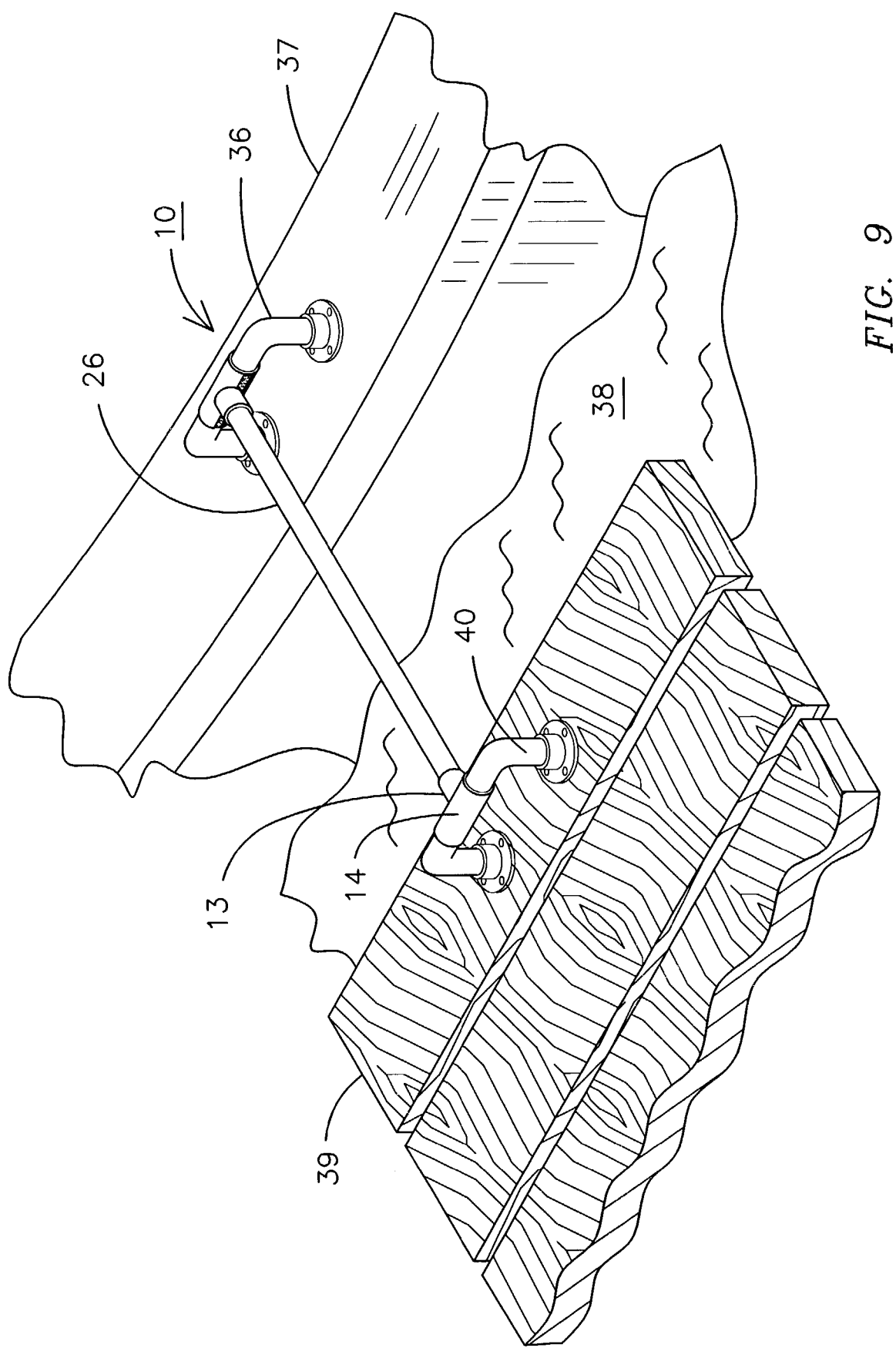
FIG. 9 is a perspective view of a boat holding bar using the bar clamps of the present invention.

Referring to FIG. 9, another use of a bar clamp connection 10 anchors a boat to a dock or pier. The bow of a boat 37 has a U-shaped boat cleat 36 anchored thereto. The boat 37 is floating in the water 38 adjacent the boat dock 39 which may also be a floating dock. The dock 39 has a U-shaped dock cleat 40 attached thereto which is similar to the boat cleat 36. An arm 26 may be a polymer or metal pipe of any desired length which is attached to a bar clamp 10 at each end thereof with the bar extending into the tubular extension 13 of each of the bar clamps 10. The bar is clamped to the boat 37 cleat 36 on one end thereof and to the dock 39 cleat 40 on the other end thereof with the strap 14 of the bar clamp strapped around the cleats 36 and 40. In this manner, the present bar clamp connection supports a boat 37 in a predetermined position away from the dock 39 so that the boat will not bang against the dock. The use of the bar clamp connection 10 in accordance with the present invention advantageously allows the rapid attachment of the anchoring bar 26 to the boat 37 and to the dock 39.

It should be clear at this point that a bar clamp connection has been provided for locking an elongated bar member, which may be a rod or a tube or the like, for removably holding the bar member in the bar clamp. The elongated bar member can be rapidly clamped and removed while the bar clamp is attached to the end of a tubular rod or pipe or the like. However, the present invention should not be construed as limited to the forms shown which are to be considered illustrative rather than restrictive.

I claim:

1. A bar clamp connection comprising:
   an elongated bar member;
   a clamp body having an elongated open sided tube having a side opening sized to receive said bar member therein, said clamp body having a tubular extension extending perpendicularly from said open sided tube for attaching to a matching tubular member; and
   a strip of hook and loop material having the hook portion thereof on one side of said material and the loop portion of said material on the other side thereof, said strip of hook and loop material being attached to said clamp body such that said strip of material can be wrapped around the open side of said open sided tube having said elongated bar member therein and one portion of the hook and loop material attached to the other portion, said strip of hook and loop material having an opening therein fitted over said clamp body tubular extension to thereby attach said strip of hook and loop material to said clamp body;
   whereby said elongated bar member can be removably attached to the clamp body.

2. The bar clamp connection in accordance with claim 1 in which said strip of hook and loop material is adhesively attached to said clamp body.

3. The bar clamp connection in accordance with claim 2 in which said strip of hook and loop material has an opening therein fitted over said clamp body tubular extension.

4. The bar clamp connection in accordance with claim 2 in which said elongated bar member is the handle of a dumbbell.

5. The bar clamp connection in accordance with claim 4 in which a pair of bar clamp bodies are each attached to the end of an elongated bar and each has a dumbbell hand grip mounted therein to thereby convert a pair of dumbbells into a barbell.

* * * * *